(12) United States Patent
Bucher

(10) Patent No.: US 6,678,737 B1
(45) Date of Patent: Jan. 13, 2004

(54) HOME NETWORK APPLIANCE AND METHOD

(75) Inventor: Tim Bucher, Los Altos, CA (US)

(73) Assignee: WebTV Networks, Inc., Mountain View, CA (US)

(*) Notice: Subject to any disclaimer, the term of this patent is extended or adjusted under 35 U.S.C. 154(b) by 0 days.

(21) Appl. No.: 09/560,978

(22) Filed: Apr. 28, 2000

(51) Int. Cl.[7] .............................................. G06F 15/16
(52) U.S. Cl. ....................................... 709/231; 709/232
(58) Field of Search ................................. 709/231, 220, 709/200, 244, 232; 725/110; 715/513; 370/353

(56) References Cited

U.S. PATENT DOCUMENTS

| | | | |
|---|---|---|---|
| 5,606,348 A | * 2/1997 | Chiu | 345/213 |
| 5,995,155 A | * 11/1999 | Schindler et al. | 348/461 |
| 6,005,861 A | * 12/1999 | Humpleman | 370/352 |
| 6,069,621 A | * 5/2000 | Schupak | 345/717 |
| 6,084,638 A | * 7/2000 | Hare et al. | 348/552 |
| 6,097,441 A | * 8/2000 | Allport | 348/552 |
| 6,219,042 B1 | * 4/2001 | Anderson et al. | 345/716 |
| 6,236,395 B1 | * 5/2001 | Sezan et al. | 345/723 |
| 6,256,554 B1 | * 7/2001 | DiLorenzo | 700/236 |
| 6,288,716 B1 | * 9/2001 | Humpleman et al. | 345/733 |
| 6,349,410 B1 | * 2/2002 | Lortz | 725/110 |
| 6,363,434 B1 | * 3/2002 | Eytchison | 709/313 |
| 6,438,109 B1 | * 8/2002 | Karaoguz et al. | 370/252 |

\* cited by examiner

Primary Examiner—Zarni Maung
Assistant Examiner—Sahera Halim
(74) Attorney, Agent, or Firm—Workman Nydegger

(57) ABSTRACT

A central data management unit (i.e., a home network appliance) receives a request for Internet data from an input device having an associated display device. The Internet data request is then transferred from the central data management unit over the Internet. The central data management unit then receives the requested Internet data, processes the data, and forwards the data to the display device associated with the input device that generated the request. The central data management unit also receives a request for multimedia data from another input device associated with yet another display device. In response to the request for multimedia data, the multimedia data is tuned from a multimedia transmission. The multimedia data is processed at the central data management unit and is forwarded to the second display device associated with the second input device. Thus, for example, the central data management unit facilitates the display of a web page at a computer monitor and a television program on a television screen.

32 Claims, 2 Drawing Sheets

HOME NETWORK APPLIANCE AND METHOD

BACKGROUND OF THE INVENTION

1. The Field of the Invention

The present invention relates to electrical computers and data processing systems. Specifically, the present invention relates to a home network appliance and method.

2. The Prior State of the Art

The number of display devices (e.g., televisions and computer monitors) in the average home or business is fast increasing. Often, several users simultaneously view data of different formats on different display devices. For example, it is common for one user to view a Web page on a computer monitor while another user simultaneously views a television program on a television monitor.

In displaying the Web page on the computer monitor, the computer processes and dispatches user-entered requests for Web page information over a phone line, ISDN connection, T1 connection or the like. When the Web page is received, the computer processes the data to be in viewable format and forwards the data to the computer monitor for display. Meanwhile, in displaying the television program on the television monitor, the television tunes to the desired television channel from within a video transmission received from an antenna, cable, satellite dish or the like. Alternatively, the television tunes to prerecorded television data. The television processes the tuned video data to be in viewable format and forwards the data to the television monitor for real time display.

Each display (e.g., the computer monitor and television display) has its own significant video and graphics processing capability. Maintaining a high level of separate processing capability for each display device can be expensive, particularly with the increasing number of home entertainment or information system components, such as video recorders, processors, cable boxes, printers, and the like. Many people cannot afford this kind of processing capability for each display device. Therefore, what is desired is a low-cost apparatus and method for displaying images and video of different formats at various display devices within a home or business.

SUMMARY OF THE INVENTION

In accordance with the present invention, a method for performing the following steps and a machine-readable medium having machine-executable instructions for performing the following steps are provided.

A central data management unit (i.e., a home network appliance) receives a request for Internet data from an input device having an associated display device. For example, the central data management unit might receive a web page request generated by a keyboard having an associated computer monitor. The Internet data request is then transmitted from the central data management unit over the Internet using, for example, a modem in response to an instruction from a processor. The central data management unit then receives the requested Internet data, processes the data, and forwards the data to the display device associated with the input device that generated the request. Thus, for example, the central data management unit facilitates the display of a web page on a computer monitor.

The central data management unit also receives a request for multimedia data from another input device associated with yet another display device. This multimedia data may include video and/or audio data. For example, the central data management unit might receive a channel request generated by a remote control having an associated television monitor. In response to the request for the multimedia data, the multimedia data is tuned from a television transmission. The multimedia data is processed at the central data management unit and forwarded to the second display device associated with the second input device. Thus, for example, the central data management unit facilitates the display of a television program on a television screen.

The multimedia data may be immediately displayed, or may be stored for later enjoyment. If stored, the multimedia data can be transcoded (i.e., read, compressed, and written back) to save memory space. The degree of compression can be based on a predetermined criteria such as the importance of the video and audio quality of the multimedia data being recorded. For example, if the multimedia data represents a talk show, video and audio quality are relatively unimportant and thus the data is greatly compressed, with some possible irreversibility. If the multimedia data represents a science fiction thriller, video and audio quality may be more important and thus the data is reversibly compressed. By performing most of the video and image processing at the central data management unit, relatively little processing is done at the devices (e.g., computer and television monitors) served by the central data management unit. This results in great cost savings.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

An apparatus and method are described for centrally managing communications among a plurality of portal devices. In this description and in the claims, a "portal device" is defined as a device that has an input device capable of receiving instructions from a user, and an output device capable of communicating information to the user. For example, the input device might be a remote control, a keyboard, a mouse, a joystick, or any other device capable of receiving user-entered instructions. The output device might be a television display, a computer monitor, a speaker, or any other device capable of communicating information to the user.

In the following description, for clarity, numerous specific details are set forth in order to provide a thorough understanding of the invention. However, it will be evident to one skilled in the art that the present invention may be practiced without these specific details. In other instances, well-known structures and devices are shown in block diagram form in order to avoid obscuring the present invention.

The embodiments of the present invention may comprise a special purpose or general-purpose computer including various computer hardware, as discussed in greater detail below. Embodiments within the scope of the present invention also include machine-readable media having machine-executable instructions or data structures stored thereon. Such machine-readable media can be any available media which can be accessed by a general purpose or special purpose computer or machine.

By way of example, and not limitation, such machine-readable media can comprise RAM, ROM, EEPROM, CD-ROM or other optical disk storage, magnetic disk storage or other magnetic storage devices, or any other medium which can be used to store the desired machine-executable instructions or data structures and which can be accessed by a general-purpose or special purpose computer or machine. When information is transferred or provided over a network or another communications connection to a computer or machine, the computer or machine properly views the connection as a machine-readable medium. Thus, such a connection is also properly termed a machine-readable medium. Combinations of the above should also be included within the scope of machine-readable media. Machine-executable instructions comprise, for example, instructions and data which cause a general-purpose computer, special purpose computer, or special purpose processing device to perform a certain function or group of functions.

Figure 1:
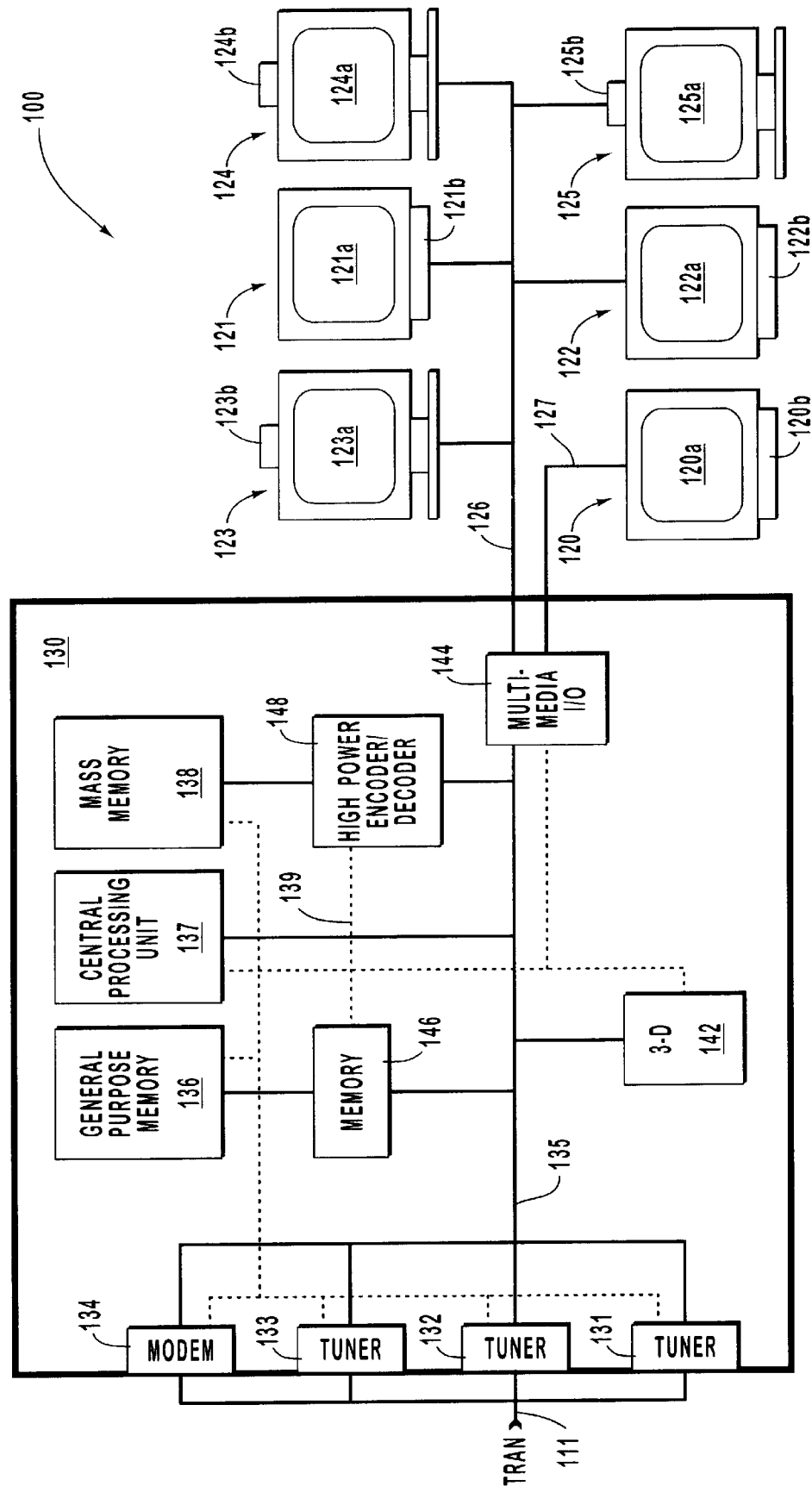
FIG. 1 is a schematic drawing of a network system according to the present invention.

The network 100 shown in FIG. 1 includes portal nodes 120–125 having respective display devices 120a–125a and network interface modules 120b–125b. In this description and in the claims, a "display device" is defined as a device capable of communicating information to a user no matter what form the information may be in. For example, audio data may be communicated to a user using a speaker. Thus, a speaker may properly be viewed as a display device. In this description and in the claims, "display" means to communicate to the user whether by vision as in a computer or television monitor, by audio as in a speaker, or by any other means recognized by a human being.

The network interface modules 120b–125b forward user-entered requests to a home network appliance (or "a central data management unit") 130, monitor the network lines 126, 127 for the requested information, and forward the information to the corresponding display device 120a–125a.

The home network appliance 130 satisfies requests, simultaneously if needed, for multimedia and Internet data issued by users at a plurality of portal devices 120–125. As used herein, the term "multimedia data" extends to video and/or audio data of substantially any type. Conventional television or broadcast signals, whether analog or digital and regardless of the source (e.g., terrestrial broadcast, cable television, satellite transmission, radio, etc.) represent multimedia data. Streaming audio and video data, such as those encoded in an MPEG or another format, are also considered multimedia data. The foregoing examples are presented by way of example, and not limitation. In contrast, the term "Internet data" extends to data of the type that is conventionally transmitted on the Internet, and also includes other similar data that can be received by the home network appliances of the invention from remote servers, information services, and the like, regardless of whether such data originates at or is received directly from the Internet.

The home network appliance 130 receives the requests over the network lines 126, 127, processes the requests, and forwards the requested information to the requesting portal device 120–125 over the network lines 126, 127. Throughout this description and in the claims, "request" includes any data structure or signal that represents that something is requested. The home network appliance 130 performs most of the processing needed to display multimedia or Internet data at the portal devices 120–125. Thus, the portal devices 120–125 need not have complex processing capability and thus may be relatively inexpensive. Although extensive processing capability is not needed at the portal devices 120–125, more complex processing capability may be desired if higher bandwidth data such as graphics or video data is to be transmitted from the portal device 120–125 to the central data management unit 130. For example, a still or video camera may act as an input device in which case some processing capability may be needed at the portal devices 120–125 in order to transmit the Internet or multimedia data to the central data management unit 130.

The structure and operation of the portal devices 120–125 to generate requests, monitor the network lines 126, 127 for the requested information, and display the requested information are first described. Thereafter, the structure and operation of the home network appliance 130 to process the request, and provide the requested information to the portal devices 120–125 are described.

Figure 2:
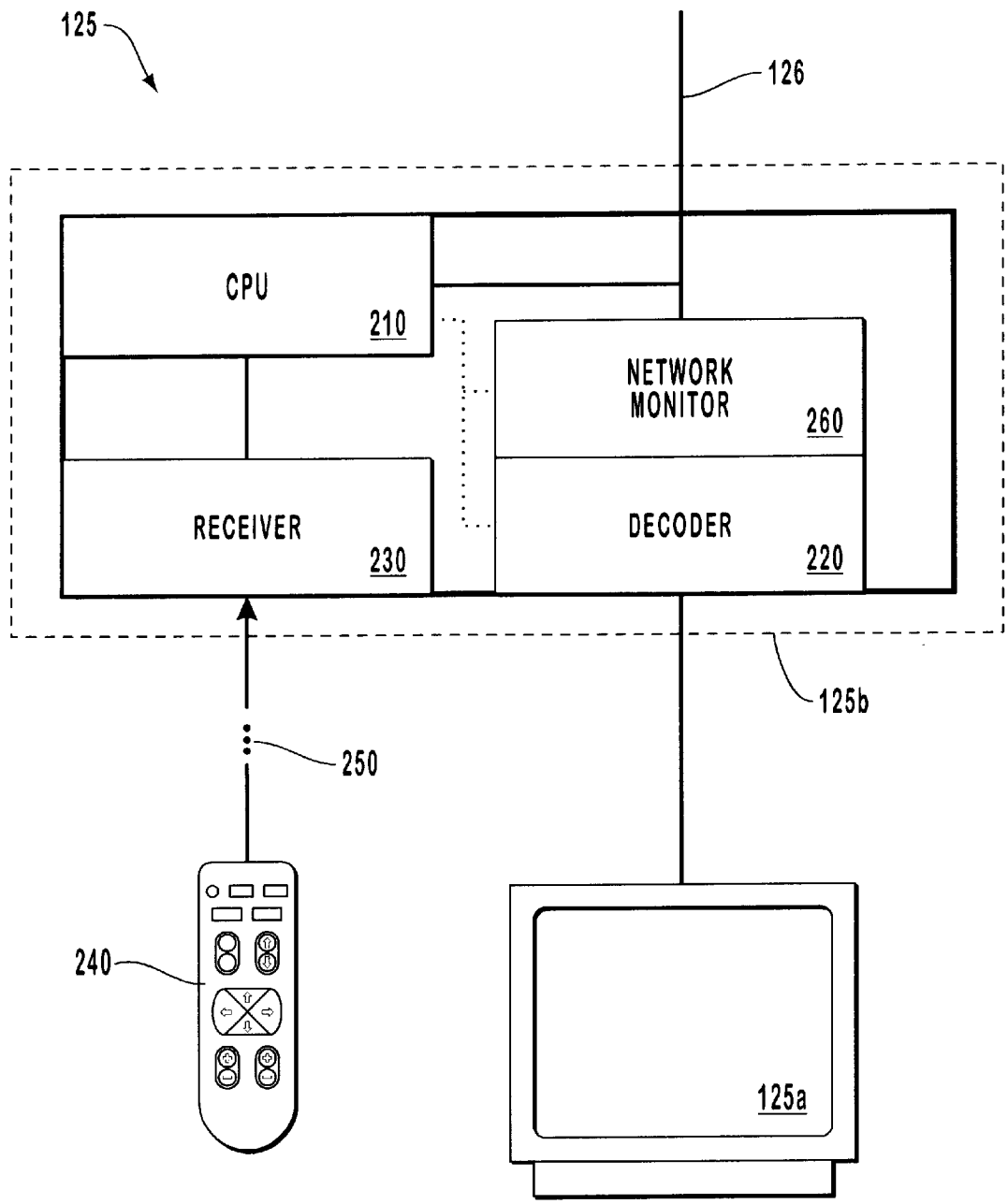
FIG. 2 is a schematic drawing of one of the portal devices of FIG. 1.

FIG. 2 is a diagram of the portal device 125 of FIG. 1 including the corresponding display device 125a and network interface module 125b. The other portal devices 120–124 may have a similar structure and operation as described below for the portal device 125. The display device 125a may be any display device including, for example, a standard definition television monitor, a high definition television monitor, a computer monitor, a speaker, or any other device capable of communicating information to a user. The network interface module 125b includes a low power CPU 210, a simple decoder 220, a receiver 230, a remote control 240, and a network monitor 260.

In transmitting a request for multimedia or Internet data, a user first generates a request using, for example, the remote control 240. There are many other devices for a user to generate requests such as a keyboard, a mouse, a joystick, or a control panel fixed to the display. The request is then transmitted to the receiver 230 using a communicative coupling 250. The communicative coupling 250 between the remote control 240 and the receiver 230 may be a wireless link such as an infrared link, or may be a cable or other conductor. The CPU 210 then forwards the request over the network line 126 to the home network appliance 130 (FIG. 1). The home network appliance 130 processes the request and forwards the information over the network line 126 as described hereinafter.

The network monitor 260 monitors the data on the network line 126 and filters through only that data which is to be displayed on the display device 125a. For example, a frame of video, audio, or Web page information may include a leading destination data field. When a destination field corresponding to the display device 125*a* is found, the data is forwarded to the decoder 220. Alternatively, the video, audio or Web page information has an associated marker representing the uniform resource locator of a Web page for Internet data, or representing the channel for video or audio data. When the data corresponding to the last request issued by the portal device 125 is detected, the data is forwarded to the decoder 220.

The decoder 220 can have a relatively simple structure since the high power encoder/decoder 148 (FIG. 1) of the home network appliance 130 performed much of the decoding. In one embodiment, the decoder 220 merely includes a frame buffer which accumulates a frame of data and, upon detection of a clock signal generated by the CPU 210, transmits the frame data directly to the display device 125*a*.

As apparent to one skilled in the art, the processing power of the CPU 210 can be quite minimal. For example, the CPU 210 may merely generate clock signals and forward user-entered instructions. Thus, the network interface module 125*b* may be quite inexpensive compared to the processors of conventional televisions and desktop computers.

The structure and operation of the home network appliance 130 to process the requests and forward the requested information to the portal devices 120–125 are now described. Referring to FIG. 1, the portal devices 120–125 provide user-entered requests over the network lines 126, 127. The network lines 126, 127 represent a communicative coupling, such as a cable or wireless coupling. The network lines 126, 127 could also be power or phone lines. If the network lines 126, 127 are power lines, the request signal may be modulated and transmitted over these lines If the network lines 126, 127 are telephone lines, the request signal is frequency modulated at high frequency without affecting normal telephone services. Note, however, that the higher the transfer rates permitted by the network lines 126, 127, the higher the bandwidth available at the portal devices 120–125. Thus, for network line 126, for example, if all the portal devices 121–125 display relatively low bandwidth Internet data, relatively low transfer rates are needed over the network line 126. On the other hand, if portal devices 121–125 display high definition video, a much higher transfer rate is needed over the network line 126.

A multimedia input/output circuit 144 receives and stores the requests that are to be interpreted by a CPU 137. If the request is for Internet data, the CPU 137 forwards the request including the uniform resource locator to a modem 134. The modem 134 forwards the request over an external line 111 and over the Internet. In anticipation of the arrival of the requested information over the external line 111, the CPU 137 causes one of the tuners (e.g., tuner 131) to tune to the requested Internet data. The tuner 131 then passes the requested Internet data typically in non-viewable formats such as hypertext markup language (HTML) format. The CPU 137 causes the high power encoder/decoder 148 to decode the HTML document. The Internet data is then forwarded to the multimedia input/output circuit 144 for distribution to the requesting portal device 120–125. The Internet data is provided with a marker that identifies the requesting portal device 120–125 so that the portal device 120–125 will recognize that it needs to display the data. Alternatively, the Internet data is provided with a marker identifying its source (i.e., the uniform resource locator).

If the request is for multimedia data such as video or audio data, the CPU 137 tunes one of the tuners (e.g., tuner 132) to the channel requested. The tuned video and audio data is then passed to the multimedia input/output circuit 144. If the portal device 120 was the requesting device, the video and audio data is provided on the network line 127. Otherwise, the video and audio data is passed over the network line 126 along with data identifying the requesting portal device 120–125. Alternatively, just audio data may be tuned in the case of a request for a radio channel.

The home network appliance 130 includes memory circuits 136, 146 for storing an operating system and for storing instructions that, when executed by CPU 137, cause the CPU 137 to operate as described herein. According to one embodiment of the invention, a 3-D processor 142 may optionally supplement the ability of the CPU 137 to process video data.

The home network appliance 130 includes three tuners 131–133. However, other numbers of tuners may also suffice. Furthermore, the configuration of the tuners 131–133 can be flexible. For example, tuner 131 might be dedicated to tuning to Internet data, tuner 132 might be dedicated to tuning to video data, and tuner 133 might be dedicated to tuning to audio data. Furthermore, one or more of tuners 131–133 might be capable of tuning to all of Internet, video, or audio data as needed. Also, one tuner might be configured to pass data directly to a memory while the other passes the data for immediate display. Internet data may be received by another mechanism, such as a modem or DSL connection.

Although Internet, video, and audio data may be retrieved for immediate display, a user may request that the home network appliance 130 perform a variety of other functions. For example, the user may request that the home network appliance 130 record Internet, video, or audio data. In the case of video and audio data, the CPU 137 instructs the high power encoder/decoder 148 to provide the video data and audio data to a mass memory 138 for storage rather than to the multimedia input/output circuit 144 for immediate display. The mass memory 138 may be any form of machine-readable memory medium including magnetic or optical memory.

The home network appliance 130 may also transcode the muliti-media data stored in the mass memory 138 when the home network appliance 130 is off-line as in the late evening when there are no users issuing requests. Transcoding of multimedia data can be done in real time, as well, to conserve disk storage resources and bandwidth of the network. The high-power encoder/decoder 148 reads the video data and audio data from the mass memory 138, compresses the data, and writes the data back to the mass memory 138, thus saving valuable memory space. For example, a television program that usually occupies 8 megabits per second of real-time video may be compressed to, for example, 2 megabits per second.

The home network appliances of the invention can transcode multimedia data, such as MPEG data, by compressing it in any of a number of ways, including quality transcoding, spatial transcoding, and temporal transcoding. For instance, quality transcoding of MPEG multimedia data can be performed by reducing the number of bits that are used to represent the data for particular portions of an image. Transcoding in this manner reduces the signal-to-noise ratio, but can be acceptable in many circumstances, depending on the nature of the images represented by the video data, the display device, and other factors. Quality transcoding can reduce the computing and network requirements associated with processing multimedia data and requires few resources, since such transcoding merely involves relatively simple processing of the multimedia bitstream.

Spatial transcoding of multimedia data involves reducing the size of images encoded in the video data, particularly in situations where the original data includes more information than can be fully rendered using the display device associated with the portal devices. For instance, spatial transcoding can be useful where high definition television data is to be viewed on a standard definition television set. Such transcoding is conducted on MPEG video data by performing a full MPEG decoding on the data, resizing the data, and performing a full MPEG encoding on the data. Although spatial transcoding can result in significant benefits, it is relatively expensive compared to quality transcoding, as it requires an MPEG decoder, a frame buffer resizer, and a MPEG encoder.

Temporal transcoding involves reducing the number of frames per second that are included in video data. For instance, an video signal having 30 frames per second can be compressed to 24 frames per second. However, performing temporal transcoding can be relatively computationally expensive compared to quality transcoding.

The degree of compression may depend on a user-entered preference for video quality. For a television program in which video quality is not important such as a talk show, the user may specify a low priority. Thus, the high power encoder/decoder 148 may compress the data such that there is a greater amount of irreversibility in the compression. Thus, when the data is decoded, some video data is lost resulting in a lower picture quality as a trade off for the smaller impact on memory. On the other hand, for television programs in which video quality is important, a user may specify a higher priority and thus the high power encoder/decoder 148 compresses the data with little or no irreversibility resulting in a higher picture quality.

Transcoding may also be used to enhance the quality of an image stored in memory. For example, if the video data stored in memory is a commercial for a company, the company may desire to have the transcoding enhance the graphical detail of the company's logo that appears in the commercial.

A user may request to have multimedia data from the mass memory 138 displayed as well. When such a request is received in the multimedia input/output circuit 144, the CPU 137 writes the data from the mass memory 138 as a real time multimedia stream. The compressed multimedia data is passed through the high power encoder/decoder 148 where it is decoded in viewable format. The real time multimedia stream passes through the multimedia input/output circuit 144 and passed onto the appropriate network line 126, 127. The requesting portal device 120–125 monitors the appropriate network line 126, 127 for multimedia data marked to identify the portal device 120–125.

The home network appliance 130 has sufficient processing power to forward multimedia and Internet data in rapid succession such that different multimedia and/or Internet data may be viewed simultaneously on some or all of the display devices 120a–125a as desired.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by united states Letters Patent is:

1. In a home network appliance that is configured to connect with a plurality of portal devices, each of the portal devices including an input device for receiving a request for at least one of Internet data and multimedia data from a user and display device for displaying the requested data to the user, wherein each display device has its own particular display requirements, and wherein the home network appliance is further configured to perform at least some of the processing of the requested data that would otherwise be required by each of the portal devices in order to display the requested data in the particular format required by each of the corresponding display devices, a method for reducing data processing capability requirements of the portal devices to display the requested data, comprising:

an act of receiving, from one or more of the plurality of portal devices at the home network appliance, a request for data;

an act of the home network appliance accessing the requested data;

an act of the home network appliance performing display processing on the requested data that is required to modify a display format of the requested data into one or more particular display formats, as required for display by each of the one or more corresponding display devices, and such that the one or more portal devices do not have to perform said display processing to the requested data in order to place the requested data into the one or more particular display formats required by the one or more corresponding display devices; and an act of transmitting the processed data to the one or more portal devices for display at the one or more portal devices.

2. A method as recited in claim 1, wherein the requested data comprises Internet data.

3. A method as recited in claim 2, further including an act of filtering the Internet data.

4. A method as recited in claim 2, wherein the processing includes converting non-viewable data into viewable data.

5. A method as recited in claim 2, further including an act of decoding the Internet data.

6. A method as recited in claim 1, wherein the requested data comprises multimedia data.

7. A method as recited in claim 6, wherein the requested data includes audio.

8. A method as recited in claim 7, wherein the requested data is received over the radio, and such that prior to processing the requested data, the method further includes an act of tuning into a radio channel.

9. A method as recited in claim 6, wherein the requested data includes video.

10. A method as recited in claim 9, wherein the processing includes 3D processing of the video.

11. A method as recited in claim 9, wherein the video includes a certain number of frames per second, and wherein processing includes reducing the number of frames per second.

12. A method as recited in claim 9, wherein the processing includes enhancing the quality of the video.

13. A method as recited in claim 6, wherein the multimedia data has a certain number of bits, and wherein processing includes reducing the number of bits.

14. A method as recited in 6, claim wherein prior to processing the requested data, the method includes tuning to a multimedia channel to access the requested data.

15. A computer program product for use in a home network appliance that is configured to connect with a plurality of portal devices, each of the portal devices including an input device for receiving a request for at least one of Internet data and multimedia data from a user and a display device for displaying the requested data to the user, wherein each display device has its own particular display requirements, and wherein the home network appliance is further configured to perform at least some of the processing of the requested data that would otherwise be required by each of the portal devices in order to display the requested data in the particular format required by each of the corresponding display devices, the computer program product comprising computer-executable instructions for implementing a method for reducing data processing capability requirements of the portal devices to display the requested data, the method comprising:

an act of receiving, from one or more of the plurality of portal devices at the home network appliance, a request for data;

an act of the home network appliance accessing the requested data;

an act of the home network appliance performing display processing on the requested data that is required to modify a display format of the requested data into one or more particular display formats, as required for display by each of the one or more corresponding display devices, and such that the one or more portal devices does not have to perform said display processing to the requested data in order to place the requested data into the one or more display formats required by the one or more corresponding display devices; and an act of transmitting the processed data to the first portal device for display by the first portal devices.

16. A computer program product as recited in claim 15, wherein the requested data comprises Internet data.

17. A computer program product as recited in claim 16, wherein the processing includes converting non-viewable data into viewable data.

18. A computer program product as recited in claim 16, wherein the method further includes decoding the Internet data.

19. A computer program product as recited in claim 15, wherein the method further includes filtering the Internet data.

20. A computer program product as recited in claim 15, wherein the requested data comprises multimedia data.

21. A computer program product as recited in claim 20, wherein the requested data includes video.

22. A computer program product as recited in claim 21, wherein the processing includes 3D processing of the video.

23. A computer program product as recited in claim 21, wherein the video includes a certain number of frames per second, and wherein processing includes reducing the number of frames per second.

24. A computer program product as recited in claim 21, wherein the processing includes enhancing the quality of the video.

25. A computer program product as recited in claim 20, wherein the multimedia data has a certain number of bits, and wherein processing includes reducing the number of bits.

26. A computer program product as recited in claim 20, wherein the requested data is received over the radio, and such that prior to processing the requested data, the method further includes an act of tuning to a radio channel.

27. A home network appliance that is configured to connected with a plurality of portal devices, each of the portal devices including an input device for receiving a request for at least one of Internet data and multimedia data from a user and a display device for displaying the requested data to the user, wherein each display device has its own particular display requirements, and wherein the home network appliance is further configured to perform at least some of the processing of the requested data that would otherwise be required by each of the portal devices in order to display the requested data in the particular format required by each of the corresponding display devices, the home network appliance, comprising:

means for receiving a request from one or more of plurality of the portal devices for data;

means for accessing the requested data;

means for performing display processing on the requested data that is required to modify a display format of the requested data into one or more particular display formats, as required for display by each of the one or more corresponding display devices, and such that the one or more portal devices do not have to perform said display processing to the requested data in order to place the requested data into the one or more particular display formats required by the one or more corresponding display devices; and means for transmitting the processed data to the one or more portal devices for display by the one or more portal devices.

28. A home network appliance as recited in claim 27, further comprising means for transcoding the requested data prior to transmitting.

29. A home network appliance as recited in claim 27, wherein means for accessing the requested data includes a first tuner dedicated to tuning to Internet data, a second tuner dedicated to tuning to audio data, and a third tuner dedicated to tuning to video data.

30. A home network appliance as recited in claim 27, wherein processing the requested data includes converting the requested data from a non-viewable format into a viewable format.

31. A home network appliance as recited in claim 27, wherein processing the requested data includes modifying the requested data from a first display format to a second display format.

32. A home network appliance as recited in claim 31, wherein processing the requested data includes modifying high definition television content for display on a standard resolution television set.

* * * * *